United States Patent [19]
Varga

[11] 3,716,148
[45] Feb. 13, 1973

[54] SPLITTING AND BLENDING OF FIBROUS BALES

[75] Inventor: John Maximilian Jules Varga, Halifax, England

[73] Assignee: Carding Specialists (Canada) Limited, Ontario, Canada

[22] Filed: Oct. 26, 1971

[21] Appl. No.: 192,218

[30] Foreign Application Priority Data

Oct. 23, 1970  Great Britain.................50,447/70

[52] U.S. Cl...............................214/8.5 C, 294/61
[51] Int. Cl.......................................B65g 59/02
[58] Field of Search...........214/8.5 R, 8.5 C; 294/61

[56] References Cited

UNITED STATES PATENTS 3,662,990  12/1970  Barnett......................214/8.5 R

FOREIGN PATENTS OR APPLICATIONS 249,698  2/1964  Australia.....................294/61

Primary Examiner—Drayton E. Hoffman
Assistant Examiner—George F. Abraham
Attorney—Richard K. Stevens et al.

[57] ABSTRACT

Apparatus for separating layers of fibrous material from a bale, comprising means for pressing on the top of the bale, a pair of splitting forks facing one another in a first horizontal plane, a pair of retaining forks facing one another in a slightly lower horizontal plane and at right angles to the first pair of forks, means for forcing the two pairs of forks into a bale from four directions, and means for lifting the pressing means and splitting forks relative to the retaining forks to separate a layer from the bale, the remainder of which is retained by the retaining forks.

8 Claims, 6 Drawing Figures

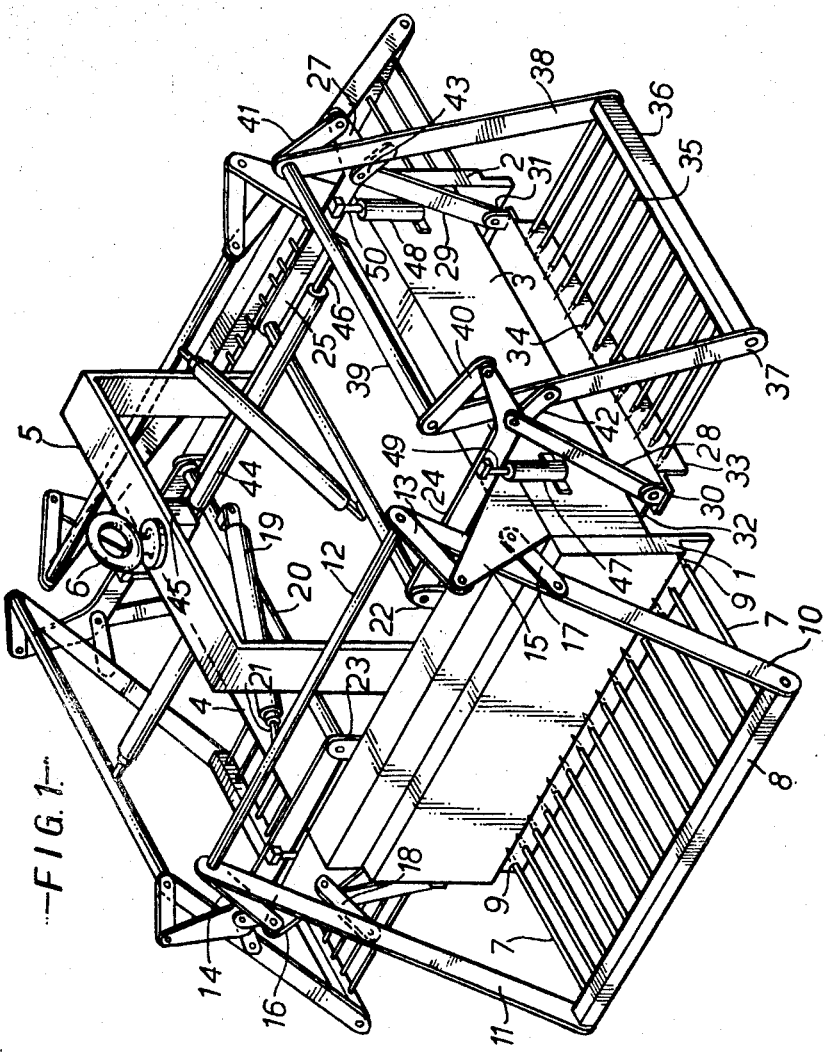

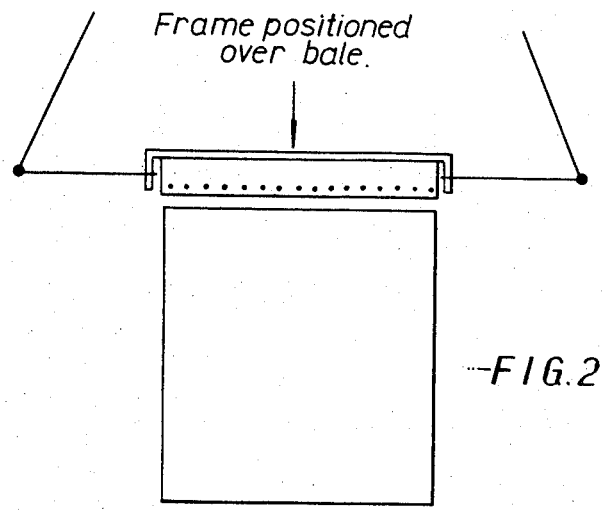
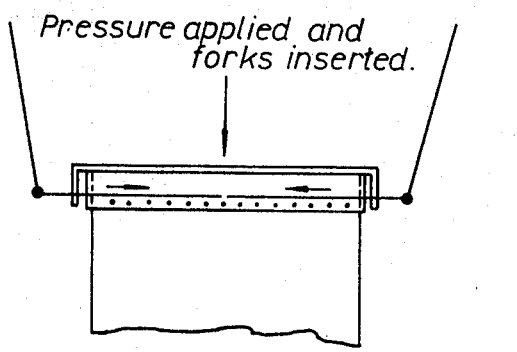
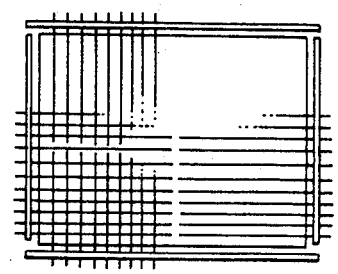
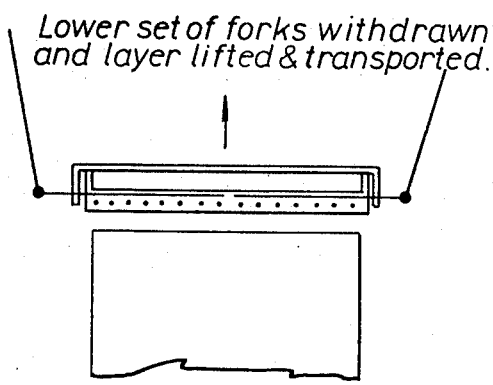
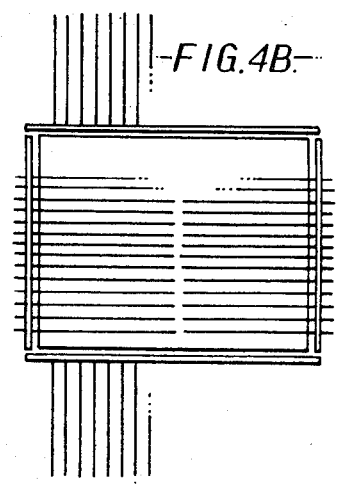

SPLITTING AND BLENDING OF FIBROUS BALES

This invention relates to apparatus for separating layers of fibrous material from a bale, which term is to be construed as including packages similar to bales. In the processing of fibrous material, for example, cotton and other textiles, it is known to locate layers of compacted fibers in superposed stepped relationship to form a continuous composite package of a predetermined depth with adjacent layers staggered one from another. The package is confined laterally and fed horizontally forward until its leading face is in a restrained position against stop means. Tufts of fibers are then mechanically plucked from the package face by reciprocal moving means whilst the package is held with a predetermined force against the stop means.

The object of this invention is to provide apparatus for separating layers of fibrous material from a bale, which layers may then be used to form the composite package above referred to.

According to the invention apparatus for separating layers of fibrous material from a bale comprises means for pressing on the top of the bale, a pair of splitting forks facing one another in a first horizontal plane, a pair of retaining forks facing one another in a slightly lower horizontal plane and at right angles to the first pair of forks, means for forcing the two pairs of forks into a bale and means for lifting the pressing means and splitting forks relative to the retaining forks to separate a layer from the bale, the remainder of which is retained by the retaining forks.

The restraining action of the retaining forks when the splitting forks are lifted causes a layer of fibrous material to be pulled from the upper surface of the bale and held above the surface of the bale. The retaining forks may then be removed from the bale and the whole apparatus may then be bodily transported to deposit the removed layer at a location remote from the bale.

Preferably, the pressing means is a pressure plate formed with end flanges having means for guiding the splitting forks during their movement between positions withdrawn from and inserted into the bale.

Each of the retaining and splitting forks may comprise a plurality of parallel spikes joined together at their tail ends by a transverse bar, and each fork may be connected to a linkage, operated by a fluid controlled ram to cause the associated fork to be inserted into and withdrawn from the bale.

A particular embodiment of apparatus according to the invention will now be described in more detail with reference to the accompanying drawings in which:

FIG. 1 is a perspective view of the apparatus from above;

FIGS. 2, 3a and 4a show schematically sequential operations of the apparatus in side elevation; and FIGS. 3b and 4b are schematic plan views corresponding to FIGS. 3a and 4a.

As shown in FIG. 1 the apparatus comprises a rigid framework having side members 1 and 2 and end members 3 and 4. Secured to the side members 1 and 2 is an upwardly projecting bridge section 5 carrying a ring 6 engageable by the hook of a hoist. Each of the side members 1 and 2 has associated therewith a retaining fork and operating means therefor. The forks on the two sides of the framework are similar and only that associated with side member 1 will be described in detail.

The fork associated with the side member 1 is made up of a plurality of parallel spikes 7 joined together at their tail ends by a transverse bar 8 and projecting at their forward ends through guide holes 9 formed in the side member 1. The transverse bar 8 is pivotally mounted to the lower ends of two parallel levers 10 and 11, the upper ends of which are pivoted to a cross member 12 and have upper links 13 and 14 respectively pivoted thereto. The other ends of the upper links 13 and 14 are pivotally mounted at the ends of sections 15 and 16 upstanding from the end plates 3 and 4. Lower links 17 and 18 parallel to the upper links 13 and 14 are also pivoted to, and extend between, the sections 15 and 16 and the arms 10 and 11. The arms 10, 13 and 17 and the arms 11, 14 and 18 each form a similar control linkage for the retaining fork. An hydraulic ram is mounted with its cylinder 19 pivotally mounted on a cross member 20 secured to the framework and its piston rod 21 pivoted to the cross bar 12. It will be seen that extension of the ram causes the linkage to move the transverse bar 8 from left to right as shown in the figure, so that the spikes are moved from the position shown to a position inserted into the space beneath the framework.

Each one of the side members 1 and 2 carries a pair of spaced lugs, for example, the spaced lugs 22 and 23 shown on side member 1. Pivoted to the lugs at each end of the apparatus is means carrying the splitting forks and associated apparatus. These are identical at each end of the apparatus and only that associated with the end wall 3 will be described in detail.

Thus, at this end of the apparatus are two parallel arms 24 and 25 having upturned end sections 26 and 27 respectively. Pivoted to the arms 24 and 25 are links 28 and 29 the lower ends of which are pivotally connected to lugs 30 and 31 formed at the corners of a pressure plate 32. The pressure plate 32 extends below the framework over substantially the whole area thereof, and has at each end and end flange such as 33 having a series of guide holes such as 34 through which spikes such as 35 of the associated splitting fork project. Parallel spikes 35 are joined together at their tail ends by a transverse bar 36 pivotally mounted at the lower ends of parallel levers 37 and 38, the upper ends of which are pivotally connected to a cross member 39. Upper links 40 and 41 are pivoted to, and extend between, the upper ends of the levers 37 and 38 and the ends of the parts 26 and 27 and lower links 42 and 43 are pivoted to, and extend between, the levers 37 and 38 and lower parts of arms 24 and 26. An hydraulic ram comprises a cylinder 44 pivotally mounted to a supporting block 45 on the bridge structure 5 and a piston rod 46 pivoted to the cross member 39. Extension of this ram will move the spikes from the position shown into a position lying within the space beneath the framework.

Secured to the end wall 3 are cylinders 47 and 48 of hydraulic lifting rams having piston rods 49 and 50 pivotally mounted to the arms 24 and 25 respectively. Extension of these rams will cause the arms 24 and 25 to move about their pivots and so lift one end of the pressure plate 32 and splitting forks relative to the retaining forks which cannot move vertically relative to the framework. Similar rams are provided on the end wall 4 for correspondingly lifting the other end of the pressure plate and the other splitting forks.

In operation, the apparatus, with all the forks in the withdrawn positions as shown in FIG. 1, is placed over the top of a bale, as shown in FIG. 2, and is lowered so that the pressure plate 32 rests on the top of the bale, the piston rods 49 and 50 being retracted so that the pressure plate and splitting forks are in their lowered positions. With the apparatus in position fluid is admitted to the cylinders 19 and 44 and the corresponding cylinders at the opposite side and end of the apparatus respectively to cause all four sets of forks to be inserted into the bale. This condition is shown in FIGS. 3a and 3b. Fluid is then admitted to cylinders 47 and 48 and the corresponding cylinders at the other end of the apparatus so that the two splitting forks and the pressure plate are lifted relative to the retaining forks. During this action the retaining forks prevent the bale from being lifted and the splitting forks tear a layer of material from the top of the bale. The retaining forks are then withdrawn by retracting piston rod 21 into cylinder 19 and similarly retracting the ram on the other side of the apparatus. The apparatus as a whole may then be bodily lifted by a hoist engaged with the ring 6 and may be transported to a location remote from the bale. The apparatus can then be lowered and the splitting forks withdrawn to their original position whereupon the layer of fibrous material will fall from beneath the pressure plate. The apparatus may of course be positioned over a conveyor to release the layer, or may be positioned at another desired position, for example, over an already partially built package to deposit the layer in a desired position in that package.

It will be appreciated that the apparatus may take many other forms. Any particular arm and linkage apparatus illustrated for operating the four sets of forks may be modified or some other form of hydraulic or mechanical or electrical operating means may be used to operate the forks so that they may be inserted into and withdrawn from a bale. The apparatus readily lends itself to inclusion of control means for causing an automatic cycle of movement and the automatic distribution of packages by the apparatus in desired locations over a feed conveyor surface.

It will be appreciated that as layers are removed from the bale the apparatus will descend to a lower level to remove a layer from the bale. Alternatively, means may be provided for raising the bale in relation to the apparatus so that the apparatus works at the same level.

What I claim is:

1. Apparatus for separating layers of fibrous material from a bale, comprising means for pressing on the top of the bale, a pair of splitting forks facing one another in a first horizontal plane, a pair of retaining forks facing one another in a slightly lower horizontal plane and at right angles to the first pair of forks, means for forcing the two pairs of forks into a bale from four directions, and means for lifting the pressing means and splitting forks relative to the retaining forks to separate a layer from the bale, the remainder of which is retained by the retaining forks.

2. Apparatus according to claim 1 in which the pressing means is a pressure plate formed with end flanges having means for guiding the splitting forks during their movement between positions withdrawn from and inserted into the bale.

3. Apparatus according to claim 2 including a rigid framework having side members perpendicular to the flanges and formed with holes for guiding the retaining forks during their movement between positions withdrawn from and inserted into the bale.

4. Apparatus according to claim 3 in which each retaining fork comprises a plurality of parallel spikes joined together at their tail ends by a transverse bar pivotally mounted on a linkage which is further pivotally mounted on the rigid framework, and fluid operated rams are provided for operating the linkages at each side of the framework to move the spikes into and out of the bale.

5. Apparatus according to claim 3 in which the pressure plate and splitting forks are mounted on arms pivotally secured to the rigid framework, and fluid operated rams extend between the arms and the framework to raise and lower the pressure plate and splitting forks relative to the retaining forks.

6. Apparatus according to claim 5 in which each splitting fork comprises a plurality of parallel spikes joined together at their tail ends by a transverse bar pivotally mounted on a linkage which is further pivotally mounted on the arms, and fluid operated rams are provided for operating the linkages at each end of the framework to move the spikes into and out of the bales.

7. Apparatus according to claim 4 in which a linkage is provided at each end of each of the transverse bars and all the linkages are similar and comprise a lever pivoted at its lower end to the transverse bar, a lower link pivoted at one end to an intermediate point on the lever and at the other end to a first point on the arm or the framework, and an upper link parallel to the lower link, pivoted at one end to the upper end of the lever, pivoted at the other end to a second point on the arm or framework, the two links extending in opposite directions from the lever.

8. Apparatus according to claim 3 in which the rigid framework is provided with means whereby the apparatus as a whole may be lifted bodily and transported to deposit a layer removed from the bale at a location remote from the bale.

* * * * *